No. 779,196.  Patented January 3, 1905.

UNITED STATES PATENT OFFICE.

DICK B. WILLIAMS, OF SCOTTDALE, PENNSYLVANIA, ASSIGNOR OF ONE-HALF TO JOSEPH R. STAUFFER, OF SCOTTDALE, PENNSYLVANIA.

CLAY PRODUCT AND PROCESS THEREFOR.

SPECIFICATION forming part of Letters Patent No. 779,196, dated January 3, 1905.

Application filed April 16, 1904. Serial No. 203,519. (Specimens.)

*To all whom it may concern:*

Be it known that I, DICK B. WILLIAMS, a citizen of the United States, residing at Scottdale, in the county of Westmoreland and State of Pennsylvania, have invented certain new and useful Improvements in Clay Products and Processes Therefor, of which the following is a specification.

This invention relates to the treatment of clays, and has specially in view a new and useful clay product and process for making the same.

A general object of the invention is to further exemplify the improved process for treating clays disclosed in a companion application filed July 2, 1903, Serial No. 164,079, and a further special object is to provide a new embodiment of the process for producing a highly-indurated product possessing utility as an abrasive for abrading purposes. As explained in the above companion application, it is found that in carrying out the generic and essential features of the process by regulating the grade or grain of the clay mixture the product becomes a practical and almost indestructible abrasive medium, and can therefore be utilized to great advantage in the manufacture of grindstones, emery-wheels, and other abrasive implements or tools.

The basic process common to both the present invention and that disclosed in the companion application, Serial No. 164,079, not only effects a peculiar and remarkable change in clay products of the pure and mixed grades, but also converts inferior and infrequently-used grades of clay, such as blue clay, into a product capable of withstanding almost an indefinite degree of heat without losing its form or general characteristics. With any of these grades of clay the process not only produces a product of a highly-refractory nature, but also possessing a great degree of hardness and of most excellent abrasive qualities. The product in these particulars possesses certain distinct and marked advantages over the products ordinarily known as "carborundum," "siloxicon," and the like. The special advantage over carborundum lies in the fact of the clay product resulting from the process of the present invention being a solid compact substance which can be produced in any desired form at a single firing and at the same time readily regulated as to the fineness of its grain or grade. Furthermore, in this connection it has been found by actual experiment that an abrasive wheel made of the process herein described will without appreciable or noticeable effect upon itself cut into a similar wheel made of the common carborundum. To distinguish this peculiar product from the analogous products known in the art, I have termed the same "carbo clay," inasmuch as the product results from the chemical change caused in clay material by the exclusive action of the gas evolved from a highly-heated body of carbon, (preferably coke.) This is quite distinct from those known processes providing for various combinations of carbon, silica, and oxygen, inasmuch as the present invention involves a treatment of the clay material wherein it is subject to the action of the carbonaceous gas while sealed from extraneous sources of oxygen.

To successfully produce the carbo clay or clay product having the marked abrasive qualities herein indicated, the process steps primarily resorted to consist in taking the form or body of clay material and drying the same, then embedding the dried form in an envelop of carbon, preferably coke, in an amorphous condition and confined in a sealed chamber, next completely surrounding the sealed chamber with an envelop of fuel-coke, and finally firing the latter to bring the confined carbon or coke to an incandescent condition and maintaining it in the incandescent state until the clay form is converted into the hardened product of carbo clay. In this process, as explained in the companion application, the carbon-gas excluded from possible union with oxygen from extraneous sources effects the peculiar change in the clay material.

The special object of the present invention to produce an abrasive product is best carried out by utilizing carbo clay or the process-treated clay as a base, although it should be understoood that other abrasive material or substance could be utilized with the modified process. However, taking up the latter in connection with the carbo clay, the first step is to take a quantity of carbo clay which is crushed and graded to the size grain required in the finished wheel. This crushed and graded material is mixed thoroughly with green or untreated clay material in the proportion of about one-third of the latter to two-thirds of the carbo clay. Sufficient water is then added to form a plastic mixture and then the mass is subjected to pressure and molded into the desired form, such as a wheel designed for grinding or abrading purposes. The molded form is then allowed to dry thoroughly, and after drying is carried through the basic process for producing carbo clay—namely, to subject the dried form to the exclusive action of the gas evolved from a body of heated carbon while sealed from extraneous sources of oxygen or oxygen-containing elements. While this result may be accomplished in various ways, yet a practical process is suggested in the companion application aforesaid, and consists in embedding the dried form in an envelop of coke or carbon placed in a sealed chamber and then enveloping the latter with a body of fuel-coke.

In all of the experiments so far tried the best results are found to be obtained by subjecting the dried form to the action of the gas evolved from a confined body of coke brought to a state of incandescence while on, against, or about the clay form and in direct physical contact therewith. However, in no experiment has this incandescent body of coke or carbon been found to mix, adhere, or attach itself in any way to the clay form. The result of this treatment of the mixture of carbo clay and green clay is a product consisting of carbo-clay grains held in place and firmly bound by a web of carbo clay. The second firing has no effect on the crushed carbo clay except of a beneficial nature, while at the same time forming and binding about it a new-formed body or web of material of the same characteristics. An abrasive wheel made of this product has no weak spots, as the entire body of the wheel cuts, and there are no foreign substances present, such as universally used in other wheels as a binder and which cause friction and constant heat.

As already indicated, in place of the carbo clay other previously-hardened granular abrasive material can be mixed with the green clay and submitted to the treatment described, with the result of producing a highly-durable and practical abrasive product.

While the exact chemical composition of the product has not yet been definitely determined, the experimental analyses so far made show that the same is markedly deficient in carbons.

Having thus described the invention, what is claimed, and desired to be secured by Letters Patent, is—

1. A process for making an abrasive product consisting in first mixing green clay with a quantity of previously-hardened abrasive material, and subsequently treating the mixture to the exclusive action of the gas evolved from a body of heated carbon.

2. A process for making an abrasive product consisting in first mixing green clay with a quantity of previously-hardened abrasive material, molding and drying the mixture, and subsequently treating the dry form to the exclusive action of coke-gas.

3. A process for making an abrasive product which consists in first mixing green or untreated clay material with a quantity of previously-hardened crushed abrasive material, molding and drying the mixture, and then subjecting the dry form to the action of the gas from an incandescent body of carbon while sealed from extraneous sources of oxygen or oxygen-containing elements.

4. A process for making an abrasive product which consists in first mixing green or untreated clay material with a quantity of crushed carbo clay, molding and drying the mixture, and then subjecting the dry form to the action of the gas from an incandescent confined body of carbon.

5. An abrasive product composed of a body of abrasive granules, and an enveloping web of abrasive material indurated thereabout.

6. An abrasive product composed of a body of hardened abrasive granules, and an enveloping web of clay material indurated about the granules during the process of manufacture.

7. An abrasive product composed of a granular body of carbo clay, and an enveloping web of carbo clay.

In testimony whereof I affix my signature in presence of two witnesses.

DICK B. WILLIAMS.

Witnesses:
   JOHN M. STAUFFER,
   E. L. RUTHERFORD.